United States Patent [19]

Birchall et al.

[11] 3,839,078

[45] Oct. 1, 1974

[54] METHOD OF COATING SUBSTRATES

[75] Inventors: James Derek Birchall; John Edward Cassidy, both of Runcorn, England

[73] Assignee: Imperial Chemical Industries Limited, London, England

[22] Filed: Dec. 3, 1971

[21] Appl. No.: 204,732

[30] Foreign Application Priority Data
Dec. 11, 1970  Great Britain..................... 59028/70
Dec. 11, 1970  Great Britain..................... 59036/70
Dec. 11, 1970  Great Britain..................... 59044/70
Dec. 11, 1970  Great Britain..................... 59045/70

[52] U.S. Cl.......... 117/119.6, 117/124 B, 117/127, 117/169 R
[51] Int. Cl.............................................. B44d 1/46
[58] Field of Search......... 117/169 R, 119.6, 124 B, 117/127, 139.5 CF, 93.1 CD

[56] References Cited
UNITED STATES PATENTS

| | | | |
|---|---|---|---|
| 2,499,261 | 2/1950 | Rosenbloom....................... | 117/127 |
| 2,909,451 | 10/1959 | Lawler et al................ | 117/139.5 CF |
| 3,044,898 | 7/1962 | Habib.............................. | 117/119.6 |
| 3,067,119 | 12/1962 | Ramaika..................... | 117/93.1 CD |

FOREIGN PATENTS OR APPLICATIONS 2,051,101  2/1971  France

*Primary Examiner*—Daniel J. Fritsch
*Assistant Examiner*—Basil J. Lewis
*Attorney, Agent, or Firm*—Cushman, Darby & Cushman

[57] ABSTRACT

A method of coating a substrate with aluminum phosphate comprising coating the substrate with a composition capable of generating aluminum phosphate on drying and heating the application and drying of the coating composition being effected under conditions such that the surface tension of the coating composition is not allowed to exceed the critical wetting tension of the substrate.

9 Claims, No Drawings

METHOD OF COATING SUBSTRATES

This invention relates to a method of coating a substrate with aluminium phosphate or a material containing aluminium phosphate.

Important properties required of a coating material are that the coating should be continuous, adequately adherent, thick enough for the required use and crack-free.

An object of the present invention to to provide a process for generating a coating of aluminium phosphate on a substrate which coating possesses the above-mentioned essential requirements.

According to the present invention there is provided a method of coating a substrate with aluminium phosphate or a material containing aluminium phosphate comprising applying to the substrate a coating composition capable of generating aluminium phosphate on heating, drying said coating to remove solvent from the coating composition and then curing said coating composition, the steps of applying and drying the coating composition being effected under conditions such that the surface tension of the coating composition does not exceed the critical wetting tension of the substrate.

The drying and curing of the coating may be carried out in one step if desired.

In this specification the term "critical wetting tension" is defined as follows with regard to a particular substrate:- i. the surface tension ($\gamma$) of a series of liquids is measured;

ii. the contact angle $\theta$ that each of these liquids makes with the substrate is measured;

iii. the cosines of the advancing contact angles ($\theta$) are plotted against the surface tensions $\gamma$ and a straight line is obtained;

iv. the intercept of the straight line with Cos $\theta=1$ is the critical wetting tension or critical surface tension ($\gamma_c$) of the substrate.

Preferably, the substrate comprises a glass, metal, ceramics, carbon, cellulosic or plastics material.

Continuous coatings of aluminium phosphate can only be obtained under conditions where the coating composition thoroughly wets the substrate. For this to occur, the surface tension of the coating solution or dispersion must not exceed the critical wetting tension of the substrate. We have ascertained that if the coating and drying procedure is carried out under ambient humidity conditions, moisture is absorbed into the wet coat with the result that the surface tension of the coat rises and dewetting takes place. We have devised two means of maintaining the surface tension of the coating solutions or dispersions at the required values.

According to a first embodiment of the invention the application and drying of the coating composition is effected in an atmosphere the relative humidity of which is sufficiently low to maintain the surface tension of the coating composition below the critical wetting tension of the substrate being coated. Preferably, the application and drying of the coating is effected in an atmosphere of relative humidity below 50 percent.

An alternative procedure to controlling humidity is to lower the surface tension of the coating solution or dispersion to such a level that absorption of water from the atmosphere does not cause the critical wetting tension of the substrate to be exceeded.

According to a second embodiment of the invention therefore the coating solution or dispersion has dissolved in it an ingredient which maintains the surface tension of the solution or dispersion below that of the critical wetting tension of the substrate during the application and drying of the coating.

Such a surface tension lowering additive allows the coating to be carried out at any humidity, but ambient humidity is preferred.

Preferably, the surface tension lowering additive is a surface-active agent, which can be anionic, cationic or non-ionic. Suitable surface-active agents include sodium lauryl sulphate, cetyl pyridinium bromide, polyethylene oxide condensates or fluorochemical surfactants.

Alternatively, the surface tension lowering additive can be an organic polymer (or copolymer) which is soluble in the coating composition, preferably an organic polymer which is thermally stable at 120°C, or more preferably stable at 200°C.

The organic polymer or copolymer may be selected from the group consisting of diene polymers, vinyl polymers, vinylidene polymers, acrylic acid polymers, methacrylic polymers, aldehyde polymers, 1—2 epoxide polymers, phenoxy resins, polyacetals, chlorinated rubbers, polyesters, unsaturated polyesters, polysulphones, polyurethanes, natural polymers, modified natural polymers, cellulose esters and ethers, and polysiloxones.

Preferred diene polymers include polybutadiene and co-polymers of butadiene and styrene. Preferred vinyl polymers include:
polyvinyl pyrrolidone
polyvinyl butyral
polyvinyl acetal
polyvinyl formal
polyvinyl alcohol
polyvinyl acetate
polyvinyl ether/maleic anhydride co-polymer A preferred polyvinylidene polymer is polyvinylidene chloride. Of the acrylic acid and methacrylic polymers we prefer to use polyethylacrylates, polymethylmethacrylates, hydroxypropylacrylates and poly(N,N-dimethyl acrylamide). Preferred 1-2 epoxide polymers include poly(ethylene oxide) and poly(ethylene glycol). Useful natural polymers include shellac, gelatine, casein and copal resin. Preferred cellulose esters include cellulose sulphate, cellulose nitrate, cellulose acetate, cellulose acetate/butyrate and cellulose propionate.

When the solvent system for the aluminium phosphate generating composition is not a solvent for the organic polymer or copolymer then mixed solvents can be used.

Particularly useful solvents are the lower aliphatic alcohols and such materials as chloroform, dimethyl formamide, dimethyl acetamide, and dimethyl sulphoxide may be admixed therewith. Methanol is a preferred solvent.

Examples of polymers which may be particularly useful in methanol include polyvinyl acetal, polyvinyl acetate, polyvinyl ethyl ether, polyethyl acrylate, poly(N,N-dimethyl acrylamide) and poly(ethylene oxide).

Examples of suitable polymer/solvent combinations include polyvinyl butyral in methanol, polyvinyl acetal in methanol, polyvinyl chloride in methanol/tetrahydrofuran, polyacrylic acid in methanol, polymethyl acrylate in tetrahydrofuran, polyacrylic acid in methanol, polymethyl acrylate in tetrahydrofuran, polymethyl methacrylate in methanol/chloroform, polyacrylonitrile in dimethyl formamide/methanol, poly(3-phenoxylene) in dimethyl formamide/methanol, polyethylene oxide in methanol/chloroform, poly(1-butene sulphone) in methanol/acetone, polyethylene terephthalate in chloral hydrate/methanol, poly(hexamethylene carbonate) in chloroform/tetrahydrofuran, chlorinated rubber in ethyl acetate/ethanol, cellulose triacetate in methanol/chloroform, cellulose nitrate in methanol, poly(dimethyl siloxane) in chloroform/methanol.

The polymer may be produced in situ in the coating composition by including the appropriate monomer in the coating composition and polymerising it by any convenient method, for example, irradiation by ultraviolet light, free radical initiation or heating.

The composition capable of generating aluminium phosphate on heating can advantageously be a halogen-containing complex of aluminium containing at least one chemically-bound molecule of a hydroxy compound ROH wherein R is a hydrogen atom or an organic group.

Alternatively coating composition can be an aluminium phosphate in solution.

We have found that the maximum permissible humidity increases as the concentration of the coating composition increases but for concentrations up to 30 percent by weight it does not approach ambient values.

Preferably therefore, the concentration of the halogen-containing complex phosphate of aluminium or aluminium phosphate in the coating solution is within the range 0.1 to 30 percent by weight, advantageously 2 to 10 percent by weight.

When the substrate is an organic plastics material then to ensure good adhesion of the coating to the plastics material either the plastics surface can be subjected to corona discharge treatment before coating or alternatively a compound which acts as a swelling agent for the plastics material can be added to the coating solution, (chlorophenols for example are the most effective swelling agents for polyester film). The plastics surface can also be treated with the swelling agent prior to coating.

The liquid medium in which the solution or dispersion of the aluminium phosphate or complex aluminium phosphate is formed may also be a swelling agent for the plastics material. However, it is usually more convenient to introduce into the solution or dispersion, a swelling agent for the plastics material which does not effect in any detrimental manner the solution or the dispersion of the aluminium phosphate or complex aluminium phosphate.

As aforesaid the coating solution or dispersion may comprise a mixture of a complex aluminium phosphate or aluminium phosphate and an organic polymer in a liquid medium. The liquid medium, in the case of a coating solution, may comprise a single solvent which solvates the two components of the mixture and in addition is a swelling agent for the plastics material, or it may comprise a mixture of two solvents, one for each component and either solvent being a swelling agent, or it may comprise a mixture of two solvents and a swelling agent. Of the mixed solvent systems, the second alternative is preferred, and it is more convenient than the single solvent system since it is more adaptable.

The coating dispersion may comprise a complex aluminium phosphate dispersed in a solution of an organic polymer in a solvent system. The complex aluminium phosphate may be in the form of finely-divided particles which are dispersed in the solution of the organic polymer. Alternatively the dispersion may be formed by dispersing a solution of the complex aluminium phosphate in a solution of the organic polymer. In this case, at least one of the components of the solvent system may be a swelling agent for the plastics surface.

The swelling agent of the solvent system is preferably miscible with the other solvent component(s) when the solvent system is a mixture of solvents.

The effect of the swelling agent on the coated plastics surface may be increased and/or made speedier by the use of heat during the coating. The temperature should be chosen such that curing of the coating does not occur or does not fully occur. Due to the action of the swelling agent on the plastics surface the complex phosphate (and the organic polymer, if present in the mixture) is able to diffuse into and at least below the surface of the article. During a subsequent heat treatment to cure the coating, the cured coating so formed is "keyed" to the surface of the article.

On heating the complex aluminum phosphates, used in the process of the invention, at relatively low temperatures, of the order 80° to 180°C, they decompose evolving a hydrogen halide and the compound ROH to form a hard abrasion-resistant aluminium phosphate.

Where R is an organic group, it is preferred that it be an aliphatic hydrocarbon group or a substituted aliphatic hydrocarbon group, for example wherein the substituent is one or more of the following: amino, phenyl, hydroxyl, carboxyl or alkoxy. Unsubstituted aliphatic alcohols are especially preferred as the hydroxy compound since complex aluminium phosphates according to the invention containing them are easily separated solids obtainable in high yield. We have found that aliphatic alcohols containing one to ten carbon atoms are especially suitable, and owing to their ready availability we prefer to use aliphatic alcohols containing from one to four carbon atoms, for example, methanol, ethyl alcohol, n-propyl alcohol or isopropyl alcohol. In preferred embodiments of the invention, ethyl alcohol is used, as the complex aluminium phosphates containing it are especially readily formed as solids in high yield.

The halogen in the halogen-containing complex phosphate of aluminium is preferably chlorine, but the compounds may contain other halogens, for example bromine or iodine.

The term "phosphate" includes phosphate esters and acid phosphates.

The ratio of the number of gram atoms of aluminium to the number of gram atoms of phosphorus in the complex phosphates of aluminium may vary over a wide range, for example from 1:2 to 2:1, but is preferably substantially 1:1 as complex phosphates having this ratio decompose at low temperatures directly to form aluminium orthophosphate having greater chemical stability and refractoriness than aluminium phosphate formed from complex phosphates with other ratios. The ratio of the number of gram atoms of aluminium to the number of gram atoms of halogen in the complex phosphates is preferably substantially 1:1.

The complex phosphates of aluminium may be monomeric or polymeric.

The monomeric forms, or the repeating units of the polymeric forms of the complex phosphates, may contain, for example, from one to five molecules of the hydroxy compound. Most frequently the number of molecules of the hydroxy compound is 4. In some cases the complex phosphates may contain molecules of different hydroxy compounds, for example they may contain both chemically-bound water and a chemically-bound organic hydroxy compound, the total number of such molecules being for example, from two to five.

Examples of such complex aluminium phosphates are those having the empirical formula $AlPClH_{25}C_8O_8$, $AlPClH_{11}O_9$ and $AlPBrH_{25}C_8O_8$. These compounds are designated aluminium chlorophosphate ethanolate, (ACPE), aluminium chlorophosphate hydrate (ACPH) and aluminium bromophosphate ethanolate (ABPE) respectively, but it is to be understood that this designation in no way implies any particular molecular structure for the compound.

The complex aluminium phosphates, containing at least one chemically-bound molecule of an organic hydroxy compound, are generally soluble in water and organic solvents, especially polar organic solvents. Complex aluminium phosphates containing chemically-bound water molecules are soluble in water. Their solubility in solvent mixtures increases as the proportion of polar solvent in the solvent mixture increases. Solvents comprising water and a water-miscible organic solvent are especially convenient for dissolving the complex phosphates. Solubility generally increases as the pH of the solution is decreased, and it is preferable to establish a pH of less than 2.5 in water solutions to maintain maximum solubility. The compounds of the invention generally give viscous solutions in water.

Especially useful organic solvents are aliphatic alcohols containing up to 10 carbon atoms, esters, polyhydric alcohols, and glycol esters. Most preferred are aliphatic alcohols containing from one to five carbon atoms, for example methanol or ethanol. The solvent may be a mixture of solvents.

The complex aluminium phosphates or a mixture containing the said complex phosphate, for example their solutions, may be prepared, for example, by reacting aluminium or an aluminium compound, preferably a halide, with a hydroxy compound R-OH and phosphoric acid, a phosphoric acid ester or a compound capable of forming phosphoric acid or a phosphoric acid ester. The aluminium halide may be a simple halide or an oxyhalide or an aluminium alkoxy halide, for example aluminium ethoxy chloride. Other suitable aluminium compounds include aluminium alkoxides, for example aluminium ethoxide. When aluminium or an aluminium compound other than a halide is used, the presence of a halogen acid is necessary. Mixtures of hydroxy compounds may be used. Substances capable of forming phosphoric acid or a phosphoric acid ester include phosphorus pentoxide, phosphorus oxyhalides and phosphorus halides. An aqueous solution of phosphoric acid may be used, conveniently an 88% solution in water, although it is preferred to ensure that no more than about 5 percent by weight of water based on the total weight of reaction mixture is present when a complex phosphate containing an organic hydroxy compound is prepared, thereby avoiding a loss of yield.

The highest yields of product are obtained when the molar ratio of aluminium to phosphorus in the reaction is substantially 1:1.

The reaction may be carried out over a wide range of temperature, but generally we prefer to use a temperature below 60°C and preferably from 0°C to 50°C, to obtain optimum yields.

Complex phosphates in which R-OH is water can be made by treating with water the complex phosphates in which ROH is an organic hydroxy compound.

In another method of preparing a suitable coating composition capable of yielding an aluminium phosphate coating, aluminium phosphate is dissolved or dispersed in hydrochloric, sulphuric, oxalic or citric acid or a compatible mixture of two or more such acids. Aluminium orthophosphate, for example may be used with hydrochloric acid at molar ratios varying between 1:0.1 and 1:10, preferably between 1:0.25 and 1:10. Solutions obtained may optionally be diluted with water before use as a coating composition. It is preferred to dilute the solutions, if required, immediately before use because the dissolved phosphates are prone to precipitate from dilute solutions on prolonged storage.

A solution of aluminium phosphate in hydrochloric acid may be for the purposes of this invention made by dissolving aluminium chloride in phosphoric acid.

Optionally, the coating compositions of the invention may contain additives which modify the structure of the aluminium phosphate deposited, for example boric acid esters and ethers, ethyl silicate and organic compounds of metals such as titanium, zirconium or tin.

The relative proportions of the components of the coating compositions used in the process of the invention may vary widely depending, for example, upon the method employed for applying the composition. As above said the coating compositions contain at least 0.1 percent by weight of complex phosphate or aluminium phosphate, preferably from 1 percent by weight to 30 percent by weight and advantageously 2 to 10 percent by weight. If the coating composition contains a surface-active agent, this may be present in any proportion necessary to achieve satisfactory wetting and spreading of the composition on the surface to be coated, but we find that normally 0.05 percent to 1 percent by weight is sufficient. Compositions especially convenient for the process of the invention have proportions in parts by weight in the following ranges:

complex phosphate 2–15
solvent 100–85

The composition may be applied to the substrate by any convenient method, for example dipping, spraying or brushing. When dipping is used we prefer to immerse the article to be coated in the composition and withdraw it slowly.

Removal of solvent is preferably brought about by drying, either by heating the applied composition and/or subjecting it to a vacuum. Low boiling solvents such as methanol may be removed readily by standing the article to which the composition has been applied in warm air. When water comprises the solvent, drying in an oven at a temperature of at least 100°C is convenient.

The deposited coating is preferably heated, conveniently after removal of the solvent, to form aluminium phosphate or a deposit containing aluminium phosphate. The duration of the heating is preferably at least 10 minutes. The form of aluminium phosphate will depend, amongst other things, upon the temperatures to which the coating is heated, although a temperature of at least 80°C is sufficient to form a coat of aluminium phosphate. Preferably the coating is heated to a temperature from 100°C to 200°C. Heating of the coating to form aluminium phosphate may be combined with the removal of solvent in a single operation. For example, if ethyl cellulosive is used as the solvent for the complex phosphate, removal of the solvent at its boiling point, namely 135°C, will also effect the heating of the deposit. When, however, the solvent is removed at a temperature of less than 80°C, further heating of the coating at a temperature of at least 80°C is usually necessary to bring about the formation of aluminium phosphate.

As has been explained hereinbefore one way of achieving a continuous coating according to the invention is to apply and dry the coating solution in an atmosphere the relative humidity of which is sufficiently low to keep the surface tension of the coating solution below the critical wetting tension of the surface being coated. This effect can be enhanced by keeping water away from the coating solution until the conversion to aluminium phosphate has been completed.

The exclusion of water is advantageous in each separate stage in which the coating composition is made or used, extending through from the initial production of the composition to its final conversion into aluminium phosphate by heating, for example in the stages of storage, formulation with solvents, mixing with solids or other components, application of the compositions to substrates, drying such coated substrates. It is preferred to exclude water at all these stages as far as is practicable, since the access of water or water vapour at any stage can be detrimental to the eventual form of aluminium phosphate obtained.

The exclusion of water is preferably achieved by carrying out any or all of the stages referred to above under substantially anhydrous conditions. The precise proportion of water which may be tolerated at any given stage will depend upon the particular properties desired in the final cured product, but can be determined by trial.

The exclusion of water can be achieved in a variety of ways, including:-
  a. drying of the components used for production of the coating composition thus reducing the possibility of any water being part of the composition itself,
  b. drying the components with which the complex phosphate or aluminium phosphate is mixed, for example solvent, particulate or other solids, and the apparatus used for such mixing,
  c. drying the air or atmosphere which comes in contact with the coating composition or surfaces to which it has been applied, for example during the stage in which solvent is evaporated from solutions of the complex phosphate or aluminium phosphate and during the heating stage,
  d. drying any surfaces or articles to which the coating compositions are applied.

The necessary degree of drying may be achieved by conventional techniques well known in the art.

The exclusion of water may also be achieved by mixing into the coating composition a proportion of a compound which reacts preferentially with water. Care should be taken, however that such a compound does not interfere with the formation of the desired aluminium phosphate.

The procedures of the present invention are particularly suitable for the following applications:- a. The Coating of Organic Plastic Films.

For many applications of plastics films it is desirable to improve the inherent characteristics of the films. It has now been found that improvements in several properties may be obtained by coating the surface of the films with aluminium phosphate. In this way it has been found possible to obtain improved products by, for example, improving abrasion resistance, decreasing the permeability to gases, altering other characteristics, such as the photosensitivity, slip properties, stiffness and the like, and by making the surfaces more antistatic.

Within the term "film" we include unitary films, i.e., films fabricated from a single component, laminated films formed by bonding together a plurality of film layers of the same or different chemical composition, and foamed films produced by incorporation of a suitable blowing agent into the film-forming melt. The thickness of a film is conveniently expressed in terms of gauge, where 100 gauge indicates a thickness of 0.0254 mm. The preferred films for use in the application of the present invention vary in thickness from about 25 to about 1500 gauge.

Suitable film-forming materials include cellulose and preferably synthetic thermoplastics such as polyolefins, for example polymers and copolymers of ethylene, propylene, butadiene, isoprene, 4-methyl pentene-1 and styrene, copolymers of ethylene with unsaturated esters such as vinyl acetate or alkyl acrylates or methacrylates, modified polystyrene, for example a styrene-maleic anhydride copolymer, polymers and copolymers of other ethylenically-unsaturated monomers such as vinyl chloride, vinylidene chloride, chloroprene, methyl methacrylate, ethyl acrylate and vinyl acetate, polyphenylene oxides and sulphides, polysulphones, polyoxymethylenes, polyamides such as polycaprolactam (Nylon 6), polyhexamethylene adipamide (Nylon 6-6) and polyundecanolactam (Nylon 11), and polycarbonates and polyesters such as polyethylene 1,2-diphenoxyethane-4,4'-dicarboxylate and polyethylene terephthalate.

Films for use in this application of the present invention are employed in either an undrawn state, i.e. in the as cast condition, for example films of polyvinyl chloride or polystyrene, or in a drawn condition in which the tensile properties of the film are improved by stretching the film, at a temperature above the second order transition point of the polymeric film either uniaxially ro biaxially in two mutually perpendicular directions in the plane of the film to orient the molecular structure of the film, and then heat-setting the film at a temperature below its melting point while the film is held under tension. Typical examples of drawn film are polypropylene and polyethylene terephthalate films.

The coatings on the films may be discontinuous in that they may need to be deposited only on selected portions of the film surface. In the case of coatings applied by a spraying process, discontinous coating is conveniently achieved by employing a suitable masking technique, whereas for coatings applied by a roller system a discontinuous coating is most conveniently achieved by means of a transfer roll which is suitably profiled to deposit the desired pattern of coating solution on to the coating roll and thence on to the film substrate.

The coating composition deposited on the substrate is dried by heating, which serves both to remove solvent, if present, and to convert the coating composition to a strongly adherent layer of aluminium phosphate on the substrate. Heating of the coating is effected by any convenient means, for example by passage of the coated film through an air oven maintained at the requisite temperature. Alternatively, when the film is incapable of withstanding the curing temperature, the coating is heated by a method which does not heat the film, for example by micro-wave heating. The duration of heating is preferably at least 10 minutes. Although a temperature of at least 80°C is normally sufficient to form a coat of aluminium phosphate, the coating is preferably heated to a temperature in excess of 100°C.

In the process of coating the film it has been found that optimum results are achieved if at least the first coat applied to the film is in the form of a dilute solution, for example a 5 percent by weight solution of a complex aluminium phosphate in methanol. Dilute solutions appear to have superior wetting to those containing, for example 20 percent by weight of a complex aluminium phosphate in methanol. Once the primary coat has been deposited and dried successive coats may be deposited from concentrated solutions, for example a solution containing 20 percent by weight of a complex aluminium phosphate in methanol.

As previously indicated selected organic polymers may be dissolved in the solutions from which the coatings of the invention are produced to lower the surface tension of the coating solutions and to give coatings comprising an organic material and aluminium phosphate. Surfactants, e.g. perfluorosurfactants, may also be included to give a continuous coating. Other components, for example, crystallisation stabilisers, crystallisation suppressors and pigments, may be incorporated in the coating by including them in the coating solution. For example, when the solvent comprises water it is preferred to use a crystallisation stabiliser, such as finely-divided silica or alumina, or a nucleation activator or catalyst, for example dibutyl peroxide, or calcium, magnesium or sodium chloride. When the solution of the complex phosphate is non-aqueous, for example when the solvent is ethanol, it is preferred to use a boric acid ester or ether or a silicic acid ester or ether, for example methyl borate, trimethoxy boroxine or ethyl silicate to suppress the crystallisation of aluminium phosphate.

It has previously been mentioned that prior treatment of the substrate can be effected, e.g. corona discharge treatment, to promote adhesion of the coating to the film substrate. In addition or alternatively, fillers such as finely-divided silica, silicates or calcium carbonate may be incorporated into either or both the film and the applied coating layer to promote adhesion therebetween.

The thus coated film products are of wide applicability. They are suitable for use as electrical insulants, and, in particular, as slot liners for the core members of dynamo electric machines to insulate the current-carrying coils of wire wound around a slotted core of magnetic material.

Fabrication of slot liners from a film tape involves a number of shaping, cutting and bending operations which tend to crack the film, thereby impairing the insulating properties of the film. In addition, the slot liners are exposed to solvent attack, which crazes the film, both when the wound core member is impregnated with a solution of a resin filler in a solvent vehicle to prevent "flash-over," and when the finished machine is subsequently treated with cleansing solvents. The aluminium phosphate coating of this invention affords a degree of protection against cracking and crazing of the film substrate and the coated products are, therefore, particularly suited for use as slot liners.

The coated film products are also suitable for use as tracing and writing media, for example in the form of clear or opaque films having a pencil- or ink-receptive surface. Coatings having a thickness of less than about 3 microns are transparent and films (for example of poly(ethylene terephthalate) so coated are useful as tracing sheets for use in drawing-offices and the like. Particulate material, such as talc, clay, silica, alumina and titania, may, if desired, be incorporated in the coating layer to improve the pencil receptivity of the coated film.

Our coated films also find application as recording materials, for example the coating layer on a narrow film tape may be impregnated with magnetic materials for use in tape-recorders, computers and the like. Alternatively, the coating layer may be filled or impregnated with photosensitive materials for photographic applications, or with photochromic compounds, such as spiropyrans, for use as protective windows, screens and the like, or for recording data for storage in data banks. If desired, such tapes and films or conventional magnetic tapes, photographic films and the like may be overcoated with a layer of aluminium phosphate by the techniques herein described to provide an abrasion-resistant, anti-static, protective coating on the film or tape, and additionally conferring good slip properties on the film or tape. Additionally, the backing of the tape or film may be provided with a coating of aluminium phosphate to provide a protective, anti-static coating having good slip properties.

In addition to exhibiting considerable abrasionresistance the coated films are also relatively impermeable to contaminants such as oils, grease, fats, water, water vapour and other miscellaneous materials with which the films may come into contact. The films are, Therefore, useful as packaging materials, waterproof covers, decorative materials such as wall coverings, decorative lampshades and are suitable for all other applications for which a washable, soil-resistant substrate is desired.

Application of discontinuous coatings is particularly applicable to packaging films. For example, selected areas of a film package may be provided with an aluminium phosphate coating to improve the receptivity of the coated areas to descriptive or decorative printed matter. Alternatively, tear strips or apertures may be provided in a film package by coating appropriate areas of the package with a layer of aluminium phosphate as hereinbefore defined.

Films coated in accordance with the process of this invention also exhibit improved transparency when the applied phosphate coating is of a thickness less than about 3 microns. This we believe is a result of the filling-up of surface irregularities on the film substrate with a glass-like coating which reduces contrast at the film-air interface.

The improvement in the anti-static properties of the polymeric surfaces brought by provision of a coating of aluminium phosphate is particularly useful in the case of coated film where the film is processed in packaging machinery. The problem of the collection of static electricity on the moving film and consequent adherence of the film to the machine results in processing difficulties such as wrinkling of the film. Processing difficulties are considerably reduced when the film is provided with a thin coating of aluminium phosphate as hereinbefore described. The pick-up of dust and debris from the atmosphere is similarly considerably reduced.

b. The Provision of Abrasion-Resistant Coatings on Thermoplastic Articles

Thermoplastic sheet for example, made from a wide variety of thermoplastic polymers, is widely available but its application is limited in some cases by the relative ease with which the surface of the sheet may be scratched. This is particularly important where use is made of the transparent nature of the thermoplastic.

The thermoplastic articles which may be coated with aluminium phosphate according to the process of the invention include articles made from a variety of thermoplastics but, in particular, those suitable for manufacture in the form of rigid sheet including polymers and copolymers of esters of acrylic and methacrylic acids, polyvinyl choride, poly 4 methyl-pentene-1 and polystyrene.

To assist adhesion it is preferred that at least part of the solvent coating system comprises a monomer, such as methyl methacrylate or styrene, which is polymerisable under the curing conditions employed.

Improved adhesion may also be obtained if the sheet to be coated has been prepared by a conventional process using a casting syrup in which there is dispersed a material with which the aluminium phosphate will form an extremely strong bond. The complete specification of United Kingdom specification No. 1,080,549 describes a process for polymerising polymethyl methacrylate in which particles of inert materials such as titanium dioxide are mixed with a casting syrup which is subsequently poured into a casting cell where the particles migrate to the lower surface of the cell during polymerisation. Sheet prepared according to this method, in which finelydivided silica or aluminium phosphate are used as the inert material, gives good results when the surface containing the additive is coated with the coating solutions of the invention and subsequently cured. The aluminium phosphate may be derived from the complex aluminium phosphates by heating the complex material in a suitable form to give the fully cured material and subsequently grinding it to a suitable particle size.

c. The Production of Glass Laminates

In the term "glass" we include, as well as silicate glasses for which the term is conventionally used, transparent or translucent, substantially rigid sheet of plastics materials such as, for example, polymethyl methacrylate, polyvinyl chloride, polystyrene or polycarbonate resin.

In the manufacture of a glass laminate produced by bonding together two pieces of glass by means of a layer of substantially transparent plastics material, at least one of the glass surfaces to be bonded is coated with a phosphate coating solution of the present invention and nhe coating is cured by heating it to a temperature of at least 80°C. By the use of a coating of aluminium phosphate in accordance with the invention, the adhesion of the glass surface to the plastics interlayer is increased. This effect may be used either to achieve a greater degree of adhesion of the interlayer to the glass than when untreated glass is used, or to allow the use of bonding techniques with less critical conditions to achieve a required degree of adhesion, so that these conditions may be chosen with greater freedom to obtain, for example, a higher transparency or clarity in the resulting laminate.

Any of the transparent plastics materials known to be suitable for use in the production of laminated safety-glass may be used for bonding of the glass laminate according to this application of the invention. Preferred materials are polyvinyl butyral and certain copolymers of ethylene, including those described in U.K. Specification No. 1,166,443. The latter are copolymers of ethylene with one or more hydroxy or epoxy aliphatic or cyclo-aliphatic monoesters or acrylic acid or methacrylic acid in which the aliphatic or cycloaliphatic radical consists only of carbon, hydrogen and oxygen and contains not more than six carbon atoms, and with from 0 percent to 55 percent, by weight of the copolymer, of a further comonomer having one ethylenic double bond which is an ester of acrylic or methacrylic acid or a vinyl ester, the copolymer containing, by weight, at least 35½ of ethylene units and:

a. from 2.0 percent to 3.5 percent of free hydroxy groups; or b. from 0.3 percent to 3.0 percent of epoxy oxygen; or c. an equivalently effective amount with respect to the percentages stated in (a) and (b), of both free hydroxy groups and epoxy oxygen.

Other suitable ethylene copolymers include copolymers of ethylene with acrylic acid or methacrylic acid, and with a vinyl ester, an acrylate or a methacrylate as a third comonomer.

In a widely used process for the production of safety-glass, and suitable for making the aforesaid laminates, the sheets of glass with the film interlayer interposed between them are assembled in a suitable jig, and the assembly is placed in a flexible bag of plastics or rubber. The bag is then thoroughly evacuated, and the assembly is placed in an oven, or, preferably, in an air or oil autoclave, and heated to the desired bonding temperature. For the ethylene copolymers preferred for use in the process this is generally above 110°C, preferably between 110°C and 170°C for a heating period of about 15 to 30 minutes; but higher temperatures and different time cycles may be used. The pressure of the atmosphere, when an oven is used, or the pressure applied in the autoclave, provides for uniform contact and bonding between the glass sheets and the interlayer. The assembly is then cooled or allowed to cool before its removal from the bag.

The laminates may alternatively be made by applying heat and pressure in a mechanical or hydraulic press, with heating and cooling applied by heat transfer through the platens. The bag and autoclave method is generally much preferred for making laminates of high quality, particularly for making curved laminates.

This application of the present invention is of particular value when applied to the modification of transparent safety-glass, especially that of the type used for windscreens for motor cars and other vehicles, comprising two sheets of silicate glass, which may be curved or flat, with a layer of transparent bonding medium sandwiched between them, Such safety-glass must be made to close tolerances, particularly as regards adhesion, transparency and clarity, and the manufacturing conditions are highly critical. Any widening of the range of choice of these conditions to obtain an optimum balance of properties is thus of value. It may also be used in the production of safety-glass for windows, screens or other constructional purposes.

The invention may also be usefully applied to the modification of safety-glass of the type comprising a sheet or sheets of silicate glass bonded to a sheet of a transparent or translucent, substantially rigid plastics material bonded together by the bonding medium. Such laminates are often used, for example for bandit-resistant and bullet-resistant glass windows or screens for shops, show cases, banks, vehicles and the like. The substantially rigid plastics material used in such laminates is preferably an acrylic plastics material, especially polymethyl methacrylate, rigid polyvinyl chloride, or a polycarbonate resin.

d. Printing of the Surface of Organic Plastics Substrates Such As Films or Sheets For many applications of plastic films, for example when a film is used as a packaging material, it is desirable to imprint decorative or descriptive matter on to the film surface by means of suitable inks and dyes. Hitherto, one of the problems encountered in the printing of film surfaces has been the difficulty of ensuring adequate adhesion of the printed matter to the film surface to prevent peeling-off of the printed matter during subsequent usage of the film. To improve the adhesion between film surface and printed matter it has been necessary to subject the film surface to some form of treatment which will provide a suitable base to which the printed matter will key. Thus, the surface of a polyolefin film, for example, is etched by means of a suitable solvent prior to the application of printed matter thereto. Alternatively, the film surface may be conditioned by treatment with the oxidising agent such as chromic acid or a suitably conditioned surface may be obtained by subjecting the film surface to electron discharge treatment. These treatments are difficult to apply and are economically undesirable. We have found that the printability of a film or sheet is improved by providing on the surface of the film or sheet a coating by the method of the present invention. The surface of the organic plastics substrate is coated with a complex phosphate or aluminium phosphate solution of the invention, the phosphate layer is cured or partially cured by heating to a temperature of at least 80°C and an inked pattern is applied to the cured layer.

Suitable substrates include those plastic films mentioned in the preceding application (a).

Inks for use in printing polymeric substrates are often doped with adhesion-promoting additives to improve the bond between the substrate and the inked pattern printed thereon. Thus, inks for use in the printing of polyolefinic substrates are usually doped with polyamides ad adhesion promoters. However, the process of the present invention enables a wide range of conventional printing inks to be employed and any of the commercially available inks may be used, for example inks having aqueous or alcoholic or ketonic bases, or inks based on polyacrylates or other polymeric vehicles.

The phosphate coatings of this invention are applied either to one or to both faces of the polymeric film or sheet substrate and again the coatings may be continuous, extending over the entire surface, or discontinuous insofar as a coating is deposited only on those portions of the film surface to which printed matter is to be applied.

The required pattern or other printed matter is applied to the cured phosphate coating by an suitable printing technique, for example by rotary letter-press, flexographic, lithographic or photogravure processes.

If desired, the printed products obtained by this application of our invention may be overcoated with a second coating of aluminium phosphate by the techniques herein described, to provide an abrasion-resistant, protective layer over the printed matter.

These printed products are particularly suitable for use in the packaging industry, for example in the packaging of foodstuffs, garments or other articles where a printed package is desired, and are also suitable for the production of decorative wall-coverings and the like.

e. Improving the Durability of a Conventional Coating Composition Already Applied to a Substrate The aluminium phosphate coating of the invention serves as a physically and chemically-resistant protective layer on the surface of the principal coating. As the protective layer of aluminium phosphate can be formed by the application of only moderate heat, its formation does not involve any appreciable risk of deterioration of the underlying principal coating.

The application of the process of the invention can be used to protect coatings prepared from any conventional coating composition. The coating of aluminium phosphate thus generated is very thin and transparent, so it does not affect the appearance of the principal coating to any appreciable extent. The principal coatings themselves may be borne upon any substrate for example glass, metals, ceramics, carbon or organic polymers.

The heating step to bring about the formation of aluminium phosphate is preferably carried out after the coating composition being protected has cured or hardened, since this minimises the chance of any possible disturbance of the coating or substrate by the protective aluminium phosphate composition or the decomposition products formed by its thermal decomposition. In those cases in which the coating being protected is curable by heat and is not adversely affected, for example by traces of hydrogen chloride, or by the solvents in the phosphate coating composition, the curing of the principal coating and the protective phosphate coating may be carried out simultaneously.

Examples of coatings which may be protected include convertible and non-convertible coatings, for example paints, lacquors, varnishes enamels, automobile finishes, wire enamels, aqueous emulsion paints and the like, whether intended for decorative, protective or any other purpose. These include coating compositions based on film-formers, for example nitrocellulose, cellulose esters (for example cellulose acetate), cellulose ethers (for example ethyl cellulose); rubbers and chlorinated rubbers; polyolefines and halogenated polyolefines; polymers and copolymers of vinyl chloride, vinylidene chloride, vinyl ethers, vinyl esters (for example vinyl acetate), acrylic monomers (for example the esters, amides and nitriles of acrylic and methacrylic acids) and styrene; natural and synthetic resins, for example shellac, copal, alkyd resins, urea-formaldehyde resins, phenol-formaldehyde resins, melamine-formaldehyde resins, epoxide resins, unsaturated polyester resins; polyamides; polyurethanes; silicone resins; drying and semi-drying oils; and mixtures of these. The coating compositions may be made up with conventional adjuvants, for example solvents, vehicles and thinners; pigments, dyestuffs, lakes and other colouring matters; fillers, opacifiers; plasticisers; driers, thixotropic additives, ad desired.

The coated surface may be treated, if desired, by building up successive layers of protective composition, preferably removing at least part of the solvent from one layer applying the next. Each layer may be heated to form aluminium phosphate prior to the application of a further layer.

f. The Priming of the Surface of a Substrate Before Application of a Conventional Coating Composition The surface to be treated may be that of any desired substrate, for example glass, carbon, metals, ceramics or organic polymers, and the substrate may be in any desired form, for example fibres, films, sheets, massive form or manufactured objects. In the case of complex phosphates it is not essential for the complex to have been isolated as such before incorporation in such a 'priming' composition, and the crude reaction mixture in which the complex phosphate has been produced may be used directly for this purpose if desired. The application of the priming composition may be repeated if desired so as to build up a priming coating of desired thickness.

The coating composition which is to be applied to the primed surface may be any of the conventional coating compositions mentioned in the preceding application (e).

The coating composition may be applied to the treated surface by any convenient method, for example by dipping, spraying or brushing.

The heating step to bring about formation of aluminium phosphate is preferably carried out before the conventional coating composition is applied to the treated surface, so that any undesirable by-products of the decomposition of the phosphate coating (for example hydrogen chloride) can be removed. If the conventional coating composition is thermally stable and sufficiently unaffected by such by-products, however, and especially if the coating composition is one which is cured by heating, the heating step may be carried out after the coating composition has been applied over the deposit of phosphate composition produced by application of the priming composition.

The use of phosphate coating compositions according to the process of the present invention provides a tough, adherent film of an aluminium phosphate on the surface of the substrate, to which the conventional coating composition can adhere. This film of aluminium phosphate can be generated without the need for unduly high temperatures and, since it can be deposited from organic media, can be generated in very intimate contact with surfaces (for example those of organic polymers) which are not readily wetted by aqueous media. A solution of the complex phosphate or aluminium phosphate in an organic solvent can, for example, sufficiently permeate or swell the surface to which it is applied to enable the resulting aluminium phosphate to adhere tenaciously to the surface and provide a sound base for further coatings which would not otherwise adhere so readily.

g. Articles Such as Foils or Bottles Used in the Packaging of For Example Foodstuffs may be Coated With Aluminium Phosphate According to the Process of the Invention to Improve Their Gas Barrier Properties.

It is desirable that many articles made of plastics materials should have poor permeability to gases. Such articles include sheets or foils made of plastics material that are being used to wrap or package certain materials such as certain kinds of foodstuffs which are susceptible to decomposition, deterioration or contamination by the gases or vapours which exist in the atmosphere. Other such articles include bottles or containers in general, particularly when such bottles or containers are being used to store susceptible foodstuffs as mentioned above. Unfortunately many plastics materials commonly used in the production of such articles are unacceptably permeable to gases, and articles made therefrom therefore need to be treated to improve their gas barrier properties. Any suitable plastics material may be used to make such articles but particularly useful materials include the polymers and copolymers of vinyl chloride.

It may be necessary sometimes to prepare either the substrate or the coating composition to ensure that a particularly adherent coating is achieved, Such preparation may entail, for example, cleaning and freeing the substrate from grease or roughening the surface of the substrate or incorporating in to the phosphate coating composition a material which will enable it to bind more strongly to the substrate after decomposition.

The continouus coating of the aluminium phosphate matrix has been found to have a surprisingly high barrier resistance to gases and in particular has a very low permeability to oxygen. However, the presence of micropores in the final matrix detracts from its usefulness as an effective gas barrier. The problem may be overcome by application to the surface of the article being treated one or more further coatings of the complex aluminium phosphate, and heating or treating with microwaves to form the matrix after each further coating. Such treatment allows a composite layer to be achieved in which the micropores in successive layers are substantially out of alignment with each other so that gases cannot pass through the layer by reason of the micropores. The achievement of a gas impermeable layer is also facilitated by making each coating of the composite layer, taking into account any necessary processing or economic considerations. The achievement of the desired impermeable layer may also be facilitated by carrying out the decomposition step as slowly and/or mildly as possible so that the matrix of the aluminium phosphate has an opportunity to "fuse over" the pores left by the escaping gases during the decomposition step. Under such conditions it is sometimes not even necessary to apply more than one coating of the phosphate coating composition to the surface of the article to achieve a gas permeable layer.

As mentioned above, this application of the present invention is directed towards coating any article part or all of whose surface must have good gas barrier properties. Thus such articles include foils or sheets made of polymeric plastics materials having unacceptibly high permeability to gases such as polymers and copolymers of vinyl chloride. Such foils or sheets are used in the wrapping, packaging or protection of materials or articles which are susceptible to the gases in the atmosphere or to the gases in the environment in which the material or article is being kept or is passing through. Alternatively the wrapping, packaging, or protecting foil may need to have low permeability to prevent gases or vapours escaping from the enclosed material or article into the atmosphere or into the surrounding environment. Other articles include bottles and containers and substantially the same comments apply for these articles as for plastics foils or sheets. Again, such bottles or containers are often made of a vinyl chloride polymer which often has unacceptable permeability to gases.

Although polymers and copolymers of vinyl chloride (unplasticised or plasticised) have been mentioned as typical plastics materials from which such articles may be made, any suitable polymeric plastics material may be used. Examples of other suitable polymeric plastics materials include polymers and copolymers of alpha-olefines such as ethylene, polymers and 4-methyl pentene-1; polymers and copolymers of styrene; polymers and copolymers of methyl methacrylate; cellulose and cellulose derivatives; polyamides; polycarbonates; polyacetals; polyphenylene oxides; polysulphones; polyurethanes; polymers of phenol and formaldehyde and polymers of urea and formaldehyde. Standard additives such as stabilizers, lubricants, plasticisers, impact modifiers, processing aids, pigments, dyes and fillers may be incorporated into the plastics material to achieve a desired appearance, property or combination of properties.

The articles may be made by any suitable method. Thus foils or sheets may be produced for example by extrusion, casting or calendering and bottles and containers by blow-moulding, vacuum forming, injection moulding or any combination of these methods. The coating operation is preferably carried out after the article has been made, either by dipping, brushing or spraying a solution or dispersion of the complex aluminium phosphate on to the surface or surfaces (or any part thereof) of the article that it is desired to coat, followed by decomposition of the complex aluminium phosphate to form the matrix by heating to at least 80°C or by treating with microwaves. As mentioned above it is usually necessary to apply more than one coating of the phosphate matrix to achieve the desired level of impermeability. It is also sometimes possible to apply the coating of the phosphate to the article during the process in which it is being formed, although this can give rise to difficult processing problems.

The articles to which the coatings are applied must, of course, be able to withstand, without unacceptable deterioration or deformation, the decomposition step to which the complex aluminium phosphate has to be subjected at the time when the decomposition is carried out. Thus in many cases, the decomposition of the complex aluminium phosphate should be carried over as short a time period as possible.

h. Impregnating Cellulosic Substrates With Aluminium Phosphate

By a "cellulosic substrate" is meant a material having a content of cellulose or similar substances, typical materials including paper, wood and cork. The substrate may be in any convenient form. For example paper will normally be in the form of a sheet or strip when treated in accordance with this application of the process of the invention, but the process is also applicable to the treatment of massive substrates, such as blocks of wood and articles fabricated therefrom, and to materials in granular or powder form, such as particulate cork or wood sawdust.

For various applications of substrates of the kind herein described it is desirable that the substrate should be impregnated with one or more of a variety of agents to alter or enhance the surface properties of the substrate. Thus, it may be desired to provide a barrier coating on the surface of articles of furniture, for example a thermally reflective coating on a table top or other domestic working surface, or a barrier coating to prevent penetration of the working surface by fats and other contaminants with which the surface is likely to be in contact. A paper substrate may be impregnated for various reasons, for example to improve the printability thereof or, where the paper is intended for use as a packaging material, to provide a barrier against penetration by water, water vapour, greases, fats, oils and other miscellaneous materials which are likely to come into contact with the paper. Absorption of contaminants by cork gaskets may be prevented or reduced by providing a barrier coating on the gasket.

Application of the phosphate impregnant solution to the cellulosic substrate is achieved by any of the conventional coating techniques, for example by spraying the solution on to the surface of the substrate or by immersing the substrate in a bath of the impregnant solution. In the case of a strip-like substrate, for example a paper substrate, impregnation of both surfaces of the paper is conveniently achieved by reeling a continuous paper strip through a bath of the impregnant solution. Impregnation of one side of a paper strip is readily achieved by employment of a triple-roll system of the type employed in a lithographic printing process. In the latter impregnation process film strip is passed through the nip between a pair of contra-rotating cylindrical rolls, viz a coating roll and a backing roll. Impregnant solution is applied to the coating roll, and thence to a strip substrate, by means of a transfer roll which rotates in surface contact with the coating roll and which picks up impregnant solution from a solution reservoir, for example either by partial immersion of the transfer roll in the reservoir or by means of a multipleroll train interposed between the reservoir and the transfer roll, or by any other convenient method.

The impregnant coatings may be continuous or discontinuous, being deposited, for example, only on those portions of the substrate which are to be subjected to further treatment, as for example by the application of printed matter. In the case of impregnant coatings applied by a spraying process, discontinuous coating is conveniently achieved by employing a suitable masking technique, whereas, for coatings applied by a roller system a discontinuous coating is most conveniently achieved by means of a transfer roll which is suitably profiled to deposit the desired pattern of impregnant solution on to the coating roll and thence on to the film substrate.

Penetration of the impregnant solution into the structure of the cellulosic substrate is assisted, if desired, by effecting impregnation under conditions of superatmospheric pressure, for example by immersion of a substrate in a bath of impregnant solution maintained at a pressure greater than atmospheric.

In the case of substrates in granular or powder form, for example wood or cork, it is convenient to fill a mould of the desired shape with either a dry blend of granulated or powdered substrate and complex aluminium phosphate or of a substrate which has been coated with a solution of the complex phosphate and then to sure the contents of the mould by heating.

The complex phosphate impregnant deposited in or on the substrate is cured by heating, which serves both to remove solvent, if present, and to decompose the complex aluminium phosphate to form a strongly-adherent layer of aluminium phosphate on the substrate. Heating of the phosphate impregnant is effected by any convenient means, for example by passage of the impregnated substrate through an air oven maintained at the requisite temperature or by a heated jacket on the mould containing a granulated or powdered substrate. Alternatively, the impregnated substrate may be compressed between the platens of a heated press to form a board, or when the substrate is incapable of withstanding the curing temperature, the impregnant is heated by a method which does not heat the substrate, for example by microwave heating. The duration of heating is preferably at least 10 minutes.

Sufficient of the complex aluminium phosphate impregnant is employed in the application of the process of the invention to deposit on the cellulosic substrate a layer of cured aluminium phosphate having a thickness which is conveniently between about 0.1 to 20 microns, and preferably less than 10 microns, but when the impregnant layer is required to exhibit transparency we prefer to maintain the thickness of the cured coating below about 2.5 to 3 microns. Impregnant layers of thickness greater than about 3 microns tend to become powdery and opaque.

Organic materials, preferably polymers, may be dissolved in the solutions from which impregnant layers of this invention are produced to give layers comprising an organic material and aluminium phosphate. It can be advantageous to add a suitable wetting agent, such as a perfluorinated surfactant, to the impregnant solution to assist uniform impregnation. Other components, for example pigments and viscosity improvers, may be incorporated by including them in the impregnant solution.

Although the impregnant solutions are suitable for application directly on to untreated cellulosic substrates, the prior treatment of the substrate is not precluded, for example by mechanical roughening or electron discharge treatment, to promote adhesion of the impregnant to the substrate. In addition or alternatively, fillers such as finely-divided silica, silicates or calcium carbonate may be incorporated into either or both the cellulosic substrate and the applied impregnant layer to promote adhesion therebetween. Other additives which may be blended into the impregnant layer include anti-friction materials, such as powdered graphite, molybdenum disulphide and polytetrafluoroethylene.

The impregnated cellulosic products are of wide applicability. Thus, impregnated paper is particularly suitable for use as a packaging material to prevent contamination of goods packaged therein. Paper cups and other paper vessels, impregnated in accordance with our invention, exhibit a desirable "glass feel," and are solvent-and-scratch-resistant. The durability and wash-resistance of wallpapers and other decorative coverings is improved by our impregnation treatment, and documents of a confidential nature, such as credit cards, passports and the like, may be rendered secure against unauthorised amendment or alteration by impregnation according to the invention.

Wood substrates, including laminated woods, chip board and the like impregnated in accordance with our invention exhibit improved thermal and stain-resistance and are particularly suitable for use as domestic working surfaces such as table tops. Reclamation of wood particles or powders is also achieved by impregnation of the particles or powders with the complex phosphates which, when cured, bind these particles or powders into a type of synthetic wood.

Preformed cork gaskets for use in providing a fluid-tight joint between co-operating surfaces may be impregnated to prevent contamination of the gasket by the fluids with which it is likely to be in contact. Typical applications include cap liners for bottle closures, gaskets for joining industrial pipework, and applications where thermally-resistant gaskets are required, as, for example, in manifold-cylinder head gaskets for internal combustion engines.

Granulated cork may be bound into gaskets of the desired shape by impregnation in accordance with the process of our invention and for some applications a mixture of cork particles and complex phosphate solution can be moulded in situ, for example in a shaped flange, or aperture, thus ensuring production of a perfectly fitting gasket. Curing in situ, for example by heating the flanged joint, also ensures that the resultant gasket adheres securely to the flange to assist the formation of a fluid-tight joint.

i. Theremoplastic Sheet can be Coated According to the Process of the Invention to Give it Anti-misting Properties.

It is known to use transparent, thermoplastic materials as glazing materials in greenhouses but these can suffer from the disadvantage that the inner surface of the sheet is prone to collecting water droplets by condensation of water vapour, arising from the transpiration of plants and the general humidity of an optimum growth environment. This condensation can give rise to a variety of problems. One problem can be the reduction in the amount of sunlight reaching the plants. Although the magnitude of this problem is dependent on the needs of the particular plant being grown in the greenhouse many plants, such as tomatoes require high light conditions for optimum growth and subsequent cropping. These requirements are particularly important in the early life of a plant, such as the tomato. Secondary problems arise when the water droplets drip from the roof of the greenhouse. These drips may deleteriously affect plants, spread desease or cause costly equipment to deteriorate.

It has now been found that the tendency of the thermoplastic glazing materials to collect droplets of water, hereinafter referred to as "misting up," may be greatly reduced by providing the thermoplastic material with a coating derived from a solution or dispersion of an aluminium phosphate or a complex aluminium phosphate.

The transparent thermoplastic sheet that may be used in this invention is any transparent thermoplastic material suitable for use as a material for glazing greenhouses or any structure performing the function of controlling the environment of a growing plant such as a continuous tunnel cloche or greenhouse, particularly temporary structures of this type. Preferred materials are rigid poly(vinyl chloride), poly(methyl methacrylate) and poly(ethylene). It is to be understood that the terms poly(vinyl chloride), poly(methyl methacrylate) and poly(ethylene) are meant to include polymers containing minor amounts of other copolymerisable monomers.

The various solutions or dispersions of either the complex aluminium phosphates or of aluminium phosphate in the acidic components described may be applied to at least one surface of the transparent, thermoplastic sheet by any convenient conventional method such as spraying, brushing or dipping. The thickness of the coating applied may be up to 10 microns. The coating may be applied in a single coating step or may be applied by successive coating steps in which the applied coating is dried after each application of coating solution or dispersion.

On heating coatings obtained from solutions or dispersions of phosphates at temperatures in excess of 80°C they decompose to form a coating of aluminium phosphate. It has been found however that hydrophilic properties are conferred on the treated sheet merely by drying the applied coating at ambient temperatures. The transparent thermoplastic sheet may therefore be treated in situ merely by spraying a coating on to the sheet and allowing it to dry under the conditions obtained in the greenhouse or similar structure. Thermoplastic sheets having a thin layer of aluminium phosphate may be produced by coating the thermoplastic sheeting with a solution of the materials hereinbefore described and heating the coated sheet at a temperature above 80°C for about 10 minutes. Sheets prepared in this way, however, offer no advantage over sheets prepared by a process in which the specified coating is merely allowed to dry at ambient temperatures.

The solutions specified for coating the thermoplastic sheet may be used as a carrier for other materials which may be advantageously present in glazing sheets for greenhouses or similar structures. Thus, the coating solutions provide a convenient carrier for other materials suitable for preventing misting, for example, polymers of 2-hydroxyethyl methacrylate. Polymers of 2-hydroxyethyl methacrylate are most suitably incorporated in the coating solutions by dissolving the polymer to give an alcoholic solution prior to blending it with a coating solution which is preferably an alcoholic solution of a complex aluminium phosphate.

The coating solutions or dispersions may as stated previously contain additives to improve the adhesion of the coated layer to the thermoplastic sheet or to improve the spreading properties of the coating composition thereby obtaining a more even distribution of the coating on the thermoplastic sheet. A wide variety of surface-active materials may be used to improve the spreading properties of the coating composition. The surface-active agents are preferably soluble in the material in which the aluminium compound is dissolved or dispersed.

j. The Provision of Aluminium Phosphate Anchor Coatings on Organic Plastics Films For many applications of films it is desirable to provide a film substrate with a superstrate of another material. For example, a film intended for use as a packaging material may be provided with a heat-sealable coating such as a copolymer of vinylidene chloride with acrylonitrile, or a photographic film base may be coated with a light sensitive layer formed for example from a gelatine silver halide emulsion. However, it is difficult to develop sufficient adhesion between the film substrate and superstrate which will be maintained during subsequent processing and usage of the film.

For this reason it has been common practice to coat a surface of a film substrate with one or more adhesion promoting layers which adhere to the film substrate and to which the superstrate readily adheres. Such intermediate coating layers are often referred to as 'anchor' coatings and are derived, for example, from an isocyanate-ended polyurethane resin, a phenolformaldehyde resin or a vinylidene chloride — alkyl acrylate copolymer resin.

According to the application of the process of the invention an organic polymer film substrate is coated with a solution derived from aluminium phosphate or complex aluminium phosphate, said phosphate coating is at least partially cured by heating to a temperature of at least 80°C and a polymeric superstrate coating is then applied to the phosphate layer.

Suitable substrates include the polymeric films mentioned beforehand in application (a).

The polymeric superstrate is applied to the phosphate-coated substrate in any convenient manner. Thus, a preformed film superstrate may be bonded, by means of a suitable adhesive, to the coated substrate, or a molten polymeric superstrate may be applied directly on to the phosphate anchor coating layer by conventional melt-coating techniques. Alternatively, and preferably, the polymeric superstrate may be applied as a solution or dispersion of the polymeric material in an aqueous or organic vehicle.

Superstrates for use in the process include photosensitized coating layers, such as gelantino silver halide coatings, and heat-sealable coatings, such as copolymers of vinylidene chloride with acrylonitrile or further layers of photo or otherwise sensitized aluminium phosphate.

Other polymeric heat-sealable superstrate coatings which may be applied as dispersions are polyvinyl acetate, partially-hydrolysed polyvinyl acetate, butadiene/acrylonitrile copolymers, butadiene/styrene copolymers, butadiene/methyl methacrylate copolymers, butadiene/methyl methacrylate/styrene copolymers, methyl methacrylate/methacrylic acid copolymers, copolyesters of terephthalic acid and other dicarboxylic acid with a glycol, e.g. those containing not more than 4.0 molecular proportions of combined terephthalic acid to one molecular proportion of combined sebacic acid, copolymers of vinylidene chloride and vinyl chloride, copolymers of vinyl acetate with vinyl chloride, copolymers of vinyl acetate with and copolymers of vinyl chloride with ethylene.

An aqueous dispersion of the heat-sealable polymer may be obtained by grinding and dispersing it in water using a suitable emulsifying agent. It is, however, preferred to prepare such dispersions by polymerising the monomeric constituents of the heat-seal coating polymer in aqueous emulsion using an emulsifying agent to keep the polymer formed in a dispersed state. It is preferred to use a cationic emulsifying agent since good antistatic properties are thereby conferred on the heat-seal coated film, although some anionic emulsifying agents also confer antistatic properties on the film and may thus be used in the preparation of the dispersion of the heat-seal coating polymer.

The superstrate coating may contain additives other than cationic surface-active agents, for instance antioxidants, dyes, pigments, lubricants, anti-blocking agents and ultra-violet light stabilizers. It is particularly useful to add slip agents. These fall into two classes (a) comminuted solids which are insoluble in the heat-seal coating, for instance, starch, talc, zinc oxide, calcium carbonate, magnesium carbonate, diatomaceous earths such as "Superfloss", silica, kaolin, titanium dioxide, triferric tetroxide and other inorganic oxides, carbonates, silicates, aluminates, and alumino-silicates and finely-dispersed polymers such as polypropylene and polyvinyl chloride, the particle size of the slip agent being normally in the range 0.1 to 20 microns, and preferably for best effect in the range 0.2 to 5 microns; (b) waxy additives such as the unsaturated fatty acid amines, saturated fatty acid amines such as palmitamide, stearamide, distearamide and alkylene distearamides such as methylene and ethylene distearamide; hydroxylated fatty acid amides such as hydroxy stearamide, hydrogenated castor oil, ester type waxes, ether waxes and other hard waxes.

When the superstrate is applied to the anchor coating as a solution or dispersion, it is necessary to dry the freshly deposited superstrate coating. This is achieved by heating. This heating also serves to complete the cure of the phosphate anchor coating which becomes securely bonded to both the substrate and the superstrate. To prevent damage to the substrate it is desirable that the drying should be effected at a temperature as low as possible consistent with effective drying of the superstrate and complete curing of the phosphate anchor coat. Where the superstrate has been applied from an aqueous medium the drying temperature should be above 100°C and should, preferably, not exceed about 140°C.

As already mentioned, the superstrate coating may be applied before or after complete curing of the anchor coating. In the case of a preformed film superstrate, we prefer that the anchor coating should be completely cured before application of the superstrate to prevent blistering of the superstrate as a result of evolution of volatiles from the phosphate layer during curing.

The products of this application of our invention are particularly suitable for use in the packaging industry as heat-sealable envelopes and containers, and as photographic film base materials.

The invention is illustrated by the following Examples in which all parts and percentages are by weight.

In Examples 1 to 22 the halogen-containing complex phosphate of aluminium was prepared according to the following procedure. 160 g of anhydrous aluminium chloride was added to 1200 ml of laboratory grade ethyl alcohol. The resultant solution was cooled to 0°C and 74.4 ml of 88 percent orthophosphoric acid was added to it in a drop-wise manner and the reaction mixture stirred. The reaction was carried out in an atmosphere of dry nitrogen. The white crystalline material formed was separated from the mixture, washed with ethanol and dried under vacuum at a temperature of 0°C. 280 g of product was obtained.

The product compound had the empirical formula $AlPClH_{25}C_8O_8$ and on a dry basis gave the following chemical analysis (expressed as a percentage by weight):

| Al | P | Cl | C | H |
|---|---|---|---|---|
| 7.87 | 9.04 | 10.34 | 28.03 | 7.35 | and contained 53.76 percent by weight of chemically-bound ethyl alcohol.

In Examples 1 to 122 this product is referred to as ACPE.

Example 1

A solution was made by dissolving 2 g of ACPE in 98 g of methanol. This solution was used to coat polyester film by dipping a piece of the film in a beaker of the solution and withdrawing the film at a rate of 9 inches per minute. The dipping process was carried out inside a nitrogen-purged box in which the relative humidity was less then 5 percent. The solution continuously wetted the surface of the polyester film and after drying the coated film at ambient temperature in the purged box the film was removed from the box and the complex aluminium phosphate coating further cured by placing the coated film in an oven at a temperature of 120°C for 30 minutes. This process gave a continuous strongly adherent coating of aluminium phosphate on the polyester film substrate.

When the dipping process was carried out in an atmosphere of 15 percent relative humidity the coating retracted into discrete droplets as the polyester film was withdrawn from the coating solution.

Example 2

A solution was made by dissolving 10 g of the complex aluminium phosphate (ACPE) in 90 g of methanol. A piece of polyester film was coated with this solution by using the procedure described in Example 1 except that the relative humidity in the purged box was 20 percent. The solution continuously wetted the surface of the polyester film and after drying in the purged box the coated film was removed from the box and placed in an oven at a temperature of 120°C for 30 minutes. This process gave a continuous strongly adherent coating of aluminium phosphate on the polyester film substrate.

When the dipping process was carried out in an atmosphere of 27 percent relative humidity the coating retracted into discrete droplets as the film was withdrawn from the coating solution.

Example 3

A solution was made by dissolving 20 g of ACPE in 80 g of methanol. A piece of polyester film was coated with this solution by using the procedure described in Example 1 except that the relative humidity in the purged box was 30 percent. The solution continuously wetted the surface of the polyester film and after drying in the purged box the coated film was removed from the box and placed in an oven at a temperature of 120°C for 30 minutes. This process gave a continuous strongly adherent coating of aluminium phosphate on the polyester film substrate.

When the dipping process was carried out in an atmosphere of 45 percent relative humidity the coating retracted into discrete droplets as the film was withdrawn from the coating solution.

Example 4

A solution was made by dissolving 10 g of ACPE in 90 g of methanol. A piece of polyester film that had previously been subjected to a corona discharge on both sides was coated with this solution by using the procedure described in Example 1 except that the relative humidity in the purged box was 20 percent. The solution continuously wetted the surface of the discharge-treated polyester film and after drying in the purged box the coated film was removed from the box and placed in an oven at a temperature of 120°C for 30 minutes. This process gave a continuous strongly adherent coating of aluminium phosphate on the discharge-treated polyester substrate.

When the dipping process was carried out in an atmosphere of 27 percent relative humidity the coating retracted into discrete droplets as the polyester film was withdrawn from the coating solution.

Example 5

A solution was made by dissolving 2 g of ACPE in 98 g of methanol. This solution was used to coat a piece of nylon 66 film by dipping a piece of the nylon film in a beaker of the solution and withdrawing the film at a rate of nine inches per minute. The dipping process was carried out inside a nitrogen-purged box in which the relative humidity was less than 5 percent. The solution continuously wetted the surface of the nylon film and after drying the coated film at ambient temperature in the purged box the coated film was removed from the box and the complex aluminium phosphate coating further cured by placing the coated film in an oven at a temperature of 120°C for 30 minutes. This process gave a continuous strongly adherent coating of aluminium phosphate on the nylon 66 substrate.

When the dipping process was carried out in an atmosphere of 28 percent relative humidity the coating retracted into discrete droplets as the nylon 66 film was withdrawn from the coating solution.

Example 6

A solution was made by dissolving 10 g of ACPE in 90 g of methanol. A piece of nylon 66 film was coated with this solution by using the procedure described in Example 5 except that the relative humidity in the purged box was 30 percent. The solution continuously wetted the surface of the nylon 66 film and after drying in the purged box the coated film was removed from the box and placed in an oven at a temperature of 120°C for 30 minutes. This process gave a continuous strongly adherent coating of aluminium phosphate on the nylon 66 substrate.

When the dipping process was carried out in an atmosphere of 48 percent relative humidity the coating retracted into discrete droplets as the nylon film was withdrawn from the coating solution.

Example 7

A solution was made by dissolving 4 g of ACPE in 96 g of methanol. This solution was used to coat rigid polyvinyl chloride sheet by dipping a piece of the sheet in a beaker of the solution and withdrawing the sheet at a rate of 9 inches per minute. The dipping process was carried out inside a nitrogen-purged box in which the relative humidity was less than 5 percent. The solution continuously wetted the surface of the polyvinyl chloride sheet and after drying the coated sheet at ambient temperature in the purged box the sheet was removed from the box and the complex aluminium phosphate coating further cured by placing the coated sheet in an oven at a temperature of 120°C for 30 minutes. This process gave a continuous strongly adherent coating of aluminium phosphate on the rigid polyvinyl chloride substrate.

When the dipping process was carried out in an atmosphere of 25 percent relative humidity the coating retracted into discrete droplets as the polyvinyl chloride sheet was withdrawn from the coating solution.

Example 8

A solution was made by dissolving 10 g of ACPE in 90 g of methanol. A piece of rigid polyvinyl chloride sheet was coated with this solution by using the procedure described in Example 7 except that the relative humidity in the purged box was 10 percent. The solution continuously wetted the surface of the polyvinyl chloride sheet and after drying in the purged box the coated sheet was removed from the box and placed in an oven at a temperature of 120°C for 30 minutes. This process gave a continuous strongly adherent coating of aluminium phosphate on the rigid polyvinyl chloride substrate.

When the dipping process was carried out in an atmosphere of 35 percent relative humidity the coating retracted into discrete droplets as the polyvinyl chloride sheet was withdrawn from the coating solution.

Example 9

A solution was made by dissolving 10 g of ACPE in 90 g of methanol. This solution was used to coat polypropylene film, which had been previously subjected to a corona discharge on both sides, by dipping a piece of the film in a beaker of the solution and withdrawing the film at a rate of 9 inches per minute. The dipping process was carried out inside a nitrogen-purged box in which the relative humidity was less than 5 percent. The solution continuously wetted the surface of the discharge-treated polypropylene and after drying the coated film at ambient temperature in the purged box the coated film was removed from the box and the complex aluminium phosphate coating further cured by placing the coated film in an oven at a temperature of 120°C for 30 minutes. This process gave a continuous strongly adherent coating of aluminium phosphate on the discharge-treated polypropylene substrate.

When the dipping process was carried out in an atmosphere of 14 percent relative humidity the coating retracted into discrete droplets as the discharge-treated polypropylene film was withdrawn from the coating solution.

Example 10

A solution was made by dissolving 20 g of ACPE in 80 g of methanol. A piece of polypropylene film, which had been subjected previously to a corona discharge on both sides, was coated with this solution by using the procedure described in Example 9 except that the relative humidity in the purged box was 12 percent. The solution continuously wetted the surface of the discharge-treated polypropylene and after drying in the purged box the coated film was removed from the box and placed in an oven at a temperature of 120°C for 30 minutes. This process gave a continuous strongly adherent coating of aluminium phosphate on the discharge-treated polypropylene substrate.

When the dipping process was carried out in an atmosphere of 35 percent relative humidity the coating retracted into discrete droplets as the polypropylene film was withdrawn from the coating solution.

Example 11

A solution was made by dissolving 8 g of ACPE in 92 g of methanol. This solution was used to coat polyethylene sheet by dipping a piece of the sheet in a beaker of the solution and withdrawing the sheet at a rate of 9 inches per minute. The dipping process was carried out inside a nitrogen-purged box in which the relative humidity was less than 5 percent. The solution continuously wetted the surface of the polyethylene sheet and after drying the coated sheet at ambient temperature in the purged box the coated sheet was removed from the box and the complex aluminium phosphate coating further cured by placing the coated sheet in an oven at a temperature of 120°C for 30 minutes. This process gave a continuous strongly adherent coating of aluminium phosphate on the polyethylene substrate.

When the dipping process was carried out in an atmosphere of 30 percent relative humidity the coating retracted into discrete droplets as the polyethylene sheet was withdrawn from the coating solution.

Example 12

A solution was prepared by dissolving 2 g of ACPE and 0.1 g of polyvinylpyrrolidone in 98 g of methanol. This solution was used to coat polyester film by dipping a piece of the film in a beaker of the solution and withdrawing the film at a rate of nine inches per minute. The dipping process was carried out inside a nitrogen-purged box in which the relative humidity was 30 percent. The solution continuously wetted the surface of the polyester film and after drying the coated film at ambient temperature in the purged box the coated film was removed from the box and the complex aluminium phosphate coating further cured by placing the coated film in an oven at a temperature of 120°C for 30 minutes. This process gave a continuous strongly adherent coating of aluminium phosphate containing about 13 percent w/w of polyvinylpyrrolidone on the polyester substrate.

When a solution having the same concentration of complex aluminium phosphate as so far described but which had no polyvinylpyrrolidone added to it was prepared and used in the manner described above the coating retracted into discrete droplets as the polyester substrate was withdrawn from the coating solution.

Example 13

A solution was prepared by dissolving 2 g of ACPE and 0.1 g of polyacrylic acid in 98 g of methanol.

A piece of polyester film was coated with this solution by using the procedure described in Example 12 except that the relative humidity in the purged box was 25 percent. The solution continuously wetted the surface of the polyester film and after drying in the purged box the coated film was removed from the box and placed in an oven at a temperature of 120°C for 30 minutes. This process gave a continuous strongly adherent coating of aluminium phosphate containing about 13 percent w/w of polyacrylic acid on the polyester substrate.

When a solution having the same concentration of complex aluminium phosphate as so far described in this Example but which had no polyacrylic acid added to it was prepared and used in the manner described above the coating retracted into discrete droplets as the polyester film was withdrawn from the solution.

Example 14

A solution was prepared by dissolving 10 g of ACPE and 0.5 g of polyvinylpyrrolidone in 90 g of methanol.

A piece of polyester film was coated with this solution by using the procedure described in Example 12 except that the relative humidity in the purged box was 45 percent. The solution continuously wetted the surface of the polyester film and after drying in the purged box the coated film was removed from the box and placed in an oven at a temperature of 120°C for 30 minutes. This process gave a continuous strongly adherent coating of aluminium phosphate containing about 13 percent w/w of polyvinylpyrrolidone on the polyester substrate.

When a solution having the same concentration of complex aluminium phosphate as so far described in this Example but which had no polyvinylpyrrolidone added to it was prepared and used in the manner described above the coating retracted into discrete droplets as the polyester film was withdrawn from the solution.

Example 15

A solution was prepared by dissolving 10 g of ACPE and 0.5 of polyacrylic acid in 90 g of methanol.

A piece of polyester film was coated with this solution by using the procedure described in Example 12 except that the relative humidity in the purged box was 40 percent. The solution continuously wetted the surface of the polyester film and after drying in the purged box the coated film was removed from the box and placed in an oven at a temperature of 120°C for 30 minutes. This process gave a continuous strongly adherent coating of aluminium phosphate containing about 13 percent w/w polyacrylic acid on the polyester substrate.

When a solution having the same concentration of complex aluminium phosphate as so far described in this Example but which had no polyacrylic acid added to it was prepared and used in the manner described above the coating retracted into discrete droplets as the polyester film was withdrawn from the solution.

Example 16

A solution was prepared by dissolving 2 g of ACPE and 0.06 g of Lubrol L, a commercial surfactant which is a polymer of an alkyl phenyl condensed with ethylene oxide, in 98 g of methanol.

A piece of polyester film was coated with this solution by using the procedure described in Example 12 except that the relative humidity in the purged box was 66 percent which is typically ambient. The solution continuously wetted the surface of the polyester film and after drying in the purged box the coated film was removed from the box and placed in an oven at a temperature of 120°C for 30 minutes. This process gave a continuous adherent coating of aluminium phosphate on the polyester substrate.

When a solution having the same concentration of complex aluminium phosphate as so far described in this Example but which had no Lubrol L added to it was prepared and used in the manner described above the coating retracted into discrete droplets as the polyester film was withdrawn from the solution.

Example 17

A solution was prepared by dissolving 2 g of ACPE and 0.06 g of Lubrol L in 98 g of methanol.

A piece of polyester film, which had been subjected previously to corona discharge-treatment on both sides, was coated with this solution by using the procedure described in Example 12 except that the relative humidity in the purged box was 66 percent which is typically ambient. The solution continuously wetted the surface of the discharge-treated polyester film and after drying in the purged box the coated film was removed from the box and placed in an oven at a temperature of 120°C for 30 minutes. This process gave a continuous strongly adherent coating of aluminium phosphate on the discharge-treated polyester substrate.

When a solution having the same concentration of complex aluminium phosphate as so far described in this example but which had no Lubrol L added to it was prepared and used in the manner described above the coating retracted into discrete droplets as the discharge-treated polyester substrate was withdrawn from the solution.

Example 18

A solution was prepared by dissolving 2 g of ACPE and 2 g of parachlorometacresol in 96 g of methanol.

A piece of polyester film was coated with this solution by using the procedure described in Example 12 except that the relative humidity in the purged box was 58 percent which is typical of ambient RH. The solution continuously wetted the surface of the polyester film and after drying in the purged box the coated film was removed from the box and placed in an oven at a temperature of 120°C for 30 minutes. This process gave a continuous strongly adherent coating of aluminium phosphate on the polyester substrate. In this Example the parachlorometacresol acted both as surface tension lowering additive for the coating solution and as a swelling agent for the polyester film.

When a solution having the same concentration of complex aluminium phosphate as so far described in this Example but which had no parachlorometacresol added to it was prepared and used in the manner described above the coating retracted into discrete droplets as the polyester film was withdrawn from the solution.

Example 19

A solution was prepared by dissolving 10 g of ACPE and 0.2 g of Lubrol L in 90 g of methanol. This solution was used to coat polypropylene film that had been subjected previously to corona discharge treatment by dipping a piece of the film in a beaker of the solution and withdrawing the film at a rate of 9 inches per minute. The dipping process was carried out inside a nitrogen-purged box in which the relative humidity was 53% which is typical of ambient RH. The solution continuously wetted the surface of the polypropylene film and after drying the coated film at ambient temperature in the purged box the coated film was removed from the box and the complex aluminium phosphate coating further cured by placing the coated film in an oven at a temperature of 120°C for 30 minutes. This process gave a continuous adherent coating of aluminium phosphate on the discharge treated polypropylene film.

When a solution having the same concentration of complex aluminium phosphate as so far described but which had no Lubrol L added to it was prepared and used in the manner described above the coating retrated into discrete droplets as the polypropylene substrate was withdrawn from the coating solution.

Example 20

8 g of ACPE were dissolved in 192 g of methanol in a beaker. A 1½ × 5½ sample was cut from a roll of polyester film and wiped with a tissue to remove dust particles. The beaker, containing the solution, and the substrate were transferred to a dry box where the relative humidity was less than 10 percent. The sample was suspended in the solution by means of a clip attached to the top of the sample and one attached to a geared electrical withdrawing device. Three-quarters of the length of the film was submerged in the solution for a time between thirty seconds and three minutes. The sample was then withdrawn from the solution at a rate of 0.01 to 9 inches per minute using the electrical device. The sample was transferred to a larger beaker where it was suspended to dry, by means of the clip threaded through a glass rod across the top of the beaker, for 5 minutes. The beaker and sample were removed from the dry box and placed in an oven, whose temperature was 120°C, for 30 minutes. On removal from the oven, an impermeable glassy coating had been deposited on the polyester film substrate. The permeability to $O_2$ was measured using the isostatic gas permeability meter, GPM-200, and calculated to be $5.5 \times 10^{-20}$ mol. $mN^{-1}$ $sec^{-1}$, which is the layer permeability.

Example 21

20 g of ACPE were dissolved in 180 g of methanol in a beaker. Using the dip coating technique described in Example 20, a sample of chlorophenol-primed polyester film was coated with this solution twice, the first coating being heat treated before application of the second. The permeability of this double coat was found to be $4.6 \times 10^{-21}$ mol. $mN^{-1}$ $sec^{-1}$.

Example 22

An alternative method of coating the polymeric substrates involved pouring the prepared solutions into a glass vessel of approximate dimensions, length 7 inches diameter 2 inches, having a removable lid and three taps, two located on opposite sides of the top of the vessel, the third at the bottom of the vessel. The substrate was suspended in the solution by means of a length of string, attached to the clip on the top of the plastic, drawn through a hole in the lid. Through the taps at the top of the vessel was a flow of nitrogen. All exits were sealed, to give an atmosphere of nitrogen above the solution, before the bottom tap was opened to allow the solution to drain out over a period of time ranging from 5 minutes to 1 hour. When all the solution had been drained out of the vessel, the bottom tap was closed and the sample allowed to dry for 5 minutes before curing under the conditions described in Example 20.

A detailed surface structure analysis was carried out on the samples of Examples 20–22 using an electron scanning microscope. Photographs confirmed our expectations that indeed there were apparently no microcracks or holes present in the glassy thin films.

Example 23

A solution comprising 11 g of aluminium phosphate, 3.4 g of hydrogen chloride, 25 g of water and 60 g of methanol was used to coat polyethylene terephthalate film. A piece of the film was dipped in a beaker of the solution and withdrawn at a rate of 9 inches per minute. The dipping process was carried out in a box in which the relative humidity was less than 5 percent. The solution continuously wetted the polyester film and the coating remained continuous after drying in the purged box for ten minutes.

Example 24

A solution comprising 3.6 g of aluminium phosphate, 0.8 g of hydrogen chloride, 5.4 g of ethanol, 0.06 g of Lubrol L and 90 g of water was used to coat polyethylene terephthalate film. A piece of the film was dipped in a beaker of the solution and withdrawn at a rate of nine inches per minute. The dipping was carried out in a purged box in which the relative humidity was less than 5 percent. The solution continuously wetted the polyester film and after drying the coated film at ambient temperature in the purged box the film was removed from the box and the complex aluminium phosphate coating further cured by placing the film in an oven at 120°C for 30 minutes. This process gave a continuous adherent coating of aluminium phosphate on the polyester film.

We claim:

1. A method of coating a substrate with aluminum phosphate or a material containing aluminum phosphate comprising applying to the substrate a coating of a solution of a halogen-containing complex phosphate of aluminum containing at least one chemically-bound molecule of a hydroxy compound ROH where R is a hydrogen atom or an organic group, drying said coating to remove solvent from the coating composition and then curing the said coating composition at a temperature of at least 80°C., the steps of applying and drying the coating composition being effected under conditions such that the surface tension of the coating composition does not exceed the critical wetting tension of the substrate.

2. A method as claimed in claim 1 wherein the hydroxy compound in the halogen-containing complex phosphate of aluminium is an aliphatic alcohol containing one to 10 carbon atoms.

3. A method as claimed in claim 2 wherein the hydroxy compound is ethanol.

4. A method as claimed in claim 1 wherein the complex phosphate of aluminium contains chlorine.

5. A method as claimed in claim 1 wherein the complex phosphate of aluminium has the empirical formula $AlPClH_{25}C_8O_8$.

6. A method as claimed in claim 1 wherein the coating composition comprises the halogen-containing complex of aluminium dissolved in an organic solvent.

7. A method as claimed in claim 6 wherein the solvent is methanol.

8. A method as claimed in claim 1 wherein the concentration of the halogen-containing complex phosphate of aluminium in the coating composition is 0.1 to 30 percent by weight.

9. A method as claimed in claim 8 wherein said concentration is 2 to 10 percent by weight.

* * * * *